Nov. 11, 1924.  
G. J. PFEIFFER  
DOBBY HOOK  
Filed April 5, 1922  
1,514,925

Inventor.  
George J. Pfeiffer.  
Southgate & Southgate  
Attorneys

Patented Nov. 11, 1924.

1,514,925

UNITED STATES PATENT OFFICE.

GEORGE J. PFEIFFER, OF PROVIDENCE, RHODE ISLAND, ASSIGNOR TO CROMPTON & KNOWLES LOOM WORKS, OF WORCESTER, MASSACHUSETTS, A CORPORATION OF MASSACHUSETTS.

DOBBY HOOK.

Application filed April 5, 1922. Serial No. 549,754.

*To all whom it may concern:*

Be it known that I, GEORGE J. PFEIFFER, a citizen of the United States, residing at Providence, in the county of Providence and State of Rhode Island, have invented a new and useful Dobby Hook, of which the following is a specification.

This invention relates to a hook especially designed for use in loom dobbies.

It is the object of my invention to provide an improved dobby hook which may be economically manufactured, and which will be reliable and satisfactory in use.

It is the further object of my invention to provide a hook which may be readily assembled with a dobby lever without necessitating the use of separate fastening devices.

A preferred form of my invention is shown in the drawings, in which—

Figure 1:
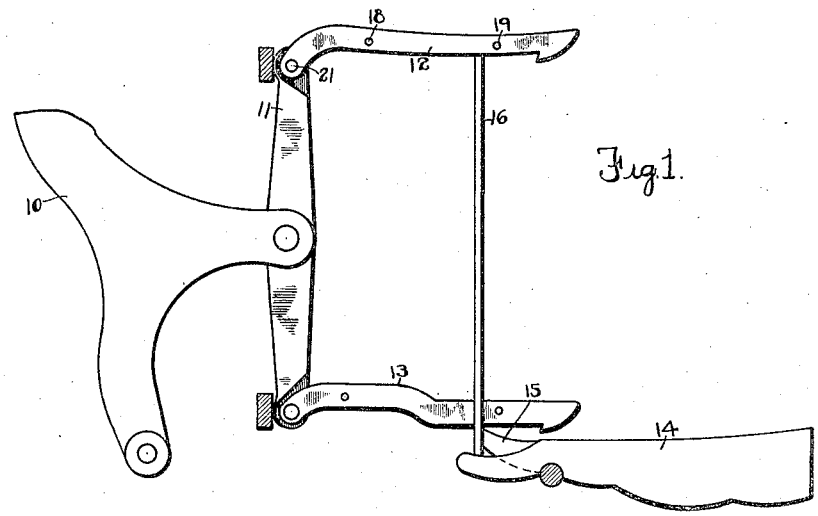
Fig. 1 is a side elevation of parts of a dobby, including my improved hooks.

Referring to Fig. 1, I have shown parts of a loom dobby comprising a jack 10, a dobby lever 11, upper and lower dobby hooks 12 and 13, lifter fingers 14 and 15, and a lifter rod 16 for the upper hook 12. These parts are in general of the usual type and perform their usual functions in the loom.

My invention relates particularly to the construction of the dobby hooks 12 or 13, and to the manner of assembling the hooks with the lever 11.

While the following description relates particularly to the upper hooks 12, it will be understood that the lower hooks 13 are similarly formed except for the variation in outline disclosed in Fig. 1.

Figures 2, 3, 4:
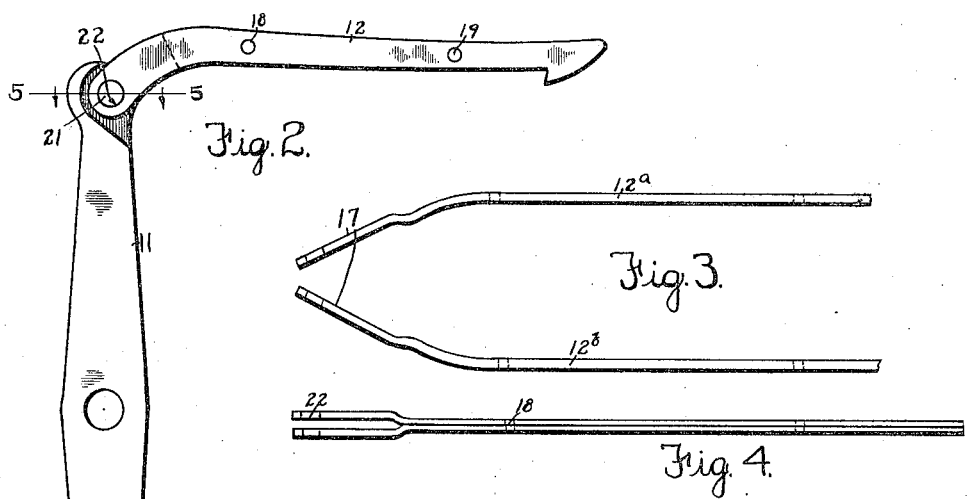
Fig. 2 is an enlarged side elevation of a dobby hook and lever.
Fig. 3 is a detail plan view of the two parts of a hook before assembling.
Fig. 4 is a similar view of the assembled parts.

Each hook 12 is formed of two separate pieces of sheet metal 12ª and 12ᵇ which are initially shaped as shown in Fig. 3, with offset bearing end members 17 and with the bearing ends bent or curved inward as indicated in Fig. 3. It is desirable that the sheet metal from which these parts of the hook are formed shall be relatively hard or shall possess a considerable degree of resilience.

The parts thus formed are assembled as shown in Fig. 4, and may be secured together in any convenient manner as by rivets 18 and 19. It will be noted that the rivet 18 is located at some distance from the bearing end of the hook so that the bearing end members may be yieldingly separated in assembling the hook with its lever.

It may be found desirable to more rigidly or firmly unite the hooked ends of the plates 12ª and 12ᵇ by welding these portions together to form a single unitary structure.

Figure 5:
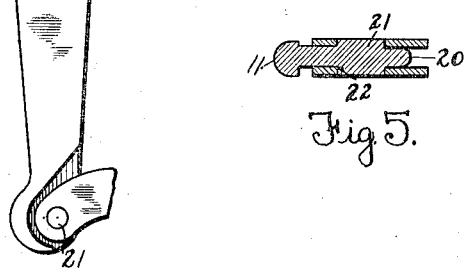
Fig. 5 is a detail sectional view taken along the line 5—5 in Fig. 2.

The ends of the lever 11 are preferably formed as indicated in Figs. 2 and 5 to provide a relatively narrow web 20 having circular bosses or projections 21 on each side thereof. These projections fit loosely within bearing openings 22 in the ends of the hooks 12 and 13.

In assembling the parts it is merely necessary to spring the bearing end members of the hook apart sufficiently so that they may be slipped over the bosses 21. When these parts 21 are aligned with the openings 22, the hook will snap into the position shown in Figs. 2 and 5 and will be firmly retained in such position by the resilience of the parts 12ª and 12ᵇ.

It will be noted that the combined width of the web 20 and the offset ends 17 of the hook does not exceed the width of the lever 11. This is a valuable feature in dobby construction in which every effort is made to reduce the width of the parts on account of the large number of duplicate parts commonly required in a single dobby.

Having thus described my invention it will be seen that I have provided a dobby hook which may be easily and economically manufactured from sheet metal and which may be easily removed or replaced in the dobby without the use of any separate fastening devices.

I do not wish to be limited to the specific details herein disclosed otherwise than as set forth in the claims, but what I do claim is:—

1. A dobby hook having a hooked end and a bearing end, said dobby hook being formed of two parts secured together at points removed from said bearing end, and said bearing ends being resilient and yieldingly separable for attachment of a dobby lever thereto.

2. A dobby hook having a hooked end and a bearing end, said dobby hook being formed of two parts welded together at the hooked end and yieldingly separable at the bearing end.

3. A dobby hook having a hooked end and a bearing end, said dobby hook being formed of two parts secured together at points removed from said bearing end and having their bearing end portions spaced apart and yieldingly separable.

4. A dobby hook having a hooked end and a bearing end, said dobby hook being formed of two parts secured together at points removed from said bearing end, and having the bearing end portions under strong inward spring tension.

5. In a loom, a dobby hook having spaced resilient yieldingly separable bearing end portions, and a dobby lever fitting between said portions and having bearing projections fitting openings therein.

6. In a loom, a dobby hook having yieldingly spaced separable bearing end portions, and a dobby lever having its end recessed to receive said end portions and having means for pivotally securing said hook to said lever.

7. In a loom, a dobby hook having spaced resilient yieldingly separable bearing end portions, a dobby lever, and means to pivotally support said lever between said hook end portions.

8. In a loom, a dobby hook having spaced resilient yieldingly separable bearing end portions, a dobby lever, and means to pivotally support said lever between said hook end portions, said means comprising bearing projections fixed on said lever and longer than the normal space between said bearing portions.

9. The process of making a dobby hook which consists in forming similar sheet metal elements having end bearing portions, bending the end portions of the elements out of alignment with the center portion, forcing the center portions of the elements into close contact, and securing the parts in such position at points relatively remote from the end bearings.

In testimony whereof I have hereunto affixed my signature.

GEORGE J. PFEIFFER.